(12) United States Patent
Boyd

(10) Patent No.: US 6,484,148 B1
(45) Date of Patent: Nov. 19, 2002

(54) ELECTRONIC ADVERTISING DEVICE AND METHOD OF USING THE SAME

(76) Inventor: John E. Boyd, 351 W. 53rd St., Apt. 4W, New York, NY (US) 10019

( * ) Notice: Subject to any disclaimer, the term of this patent is extended or adjusted under 35 U.S.C. 154(b) by 0 days.

(21) Appl. No.: 09/507,448

(22) Filed: Feb. 19, 2000

(51) Int. Cl.[7] .............................................. G06F 17/60
(52) U.S. Cl. .................................... 705/14; 340/825.49
(58) Field of Search .................. 705/1, 14; 340/825.36, 340/286.01, 7.55, 7.48, 825.49, 905; 455/41, 435

(56) References Cited

U.S. PATENT DOCUMENTS

| | | | |
|---|---|---|---|
| 4,754,582 A | 7/1988 | Cameron | 52/27 |
| D317,790 S | 6/1991 | Hey | D20/10 |
| 5,133,081 A | 7/1992 | Mayo | 455/18 |
| 5,150,116 A | 9/1992 | West | 340/928 |
| 5,214,793 A * | 5/1993 | Conway et al. | 455/49.1 |
| 5,257,017 A | 10/1993 | Jones et al. | 345/1 |
| 5,543,856 A | 8/1996 | Rosser et al. | 348/578 |
| 5,606,154 A | 2/1997 | Doigan et al. | 187/396 |
| 5,636,346 A | 6/1997 | Saxe | 395/201 |
| 5,703,564 A | 12/1997 | Begum et al. | 340/539 |
| 5,708,780 A * | 1/1998 | Levergood et al. | 395/200.12 |
| 5,724,424 A | 3/1998 | Gifford | 705/79 |
| 5,774,170 A | 6/1998 | Hite et al. | 348/9 |
| 5,819,285 A | 10/1998 | Damico et al. | 707/104 |
| 5,835,061 A * | 11/1998 | Stewart | 342/457 |
| 5,848,129 A | 12/1998 | Baker | 379/67 |
| 5,852,775 A * | 12/1998 | Hidary | 455/404 |
| 5,870,724 A | 2/1999 | Lawlor et al. | 705/42 |
| 5,873,068 A | 2/1999 | Beaumont et al. | 705/14 |
| 5,877,698 A * | 3/1999 | Kusnier et al. | 340/825.35 |
| 5,889,852 A * | 3/1999 | Rosecrans et al. | 379/355 |
| 5,913,040 A | 6/1999 | Rakavy et al. | 395/200.62 |
| 5,914,654 A | 6/1999 | Smith | 340/438 |
| 5,920,634 A | 7/1999 | Chiquette | 381/124 |

(List continued on next page.)

FOREIGN PATENT DOCUMENTS

| | | |
|---|---|---|
| EP | 0 792 068 | 8/1997 |
| EP | 0 978 814 | 2/2000 |
| GB | 2344009 A * | 5/2000 |

(List continued on next page.)

OTHER PUBLICATIONS

Riodan, Teresa, "Aiming web ads more effectively", Dec. 7, 1998, New York Times, biztech—patents, www.nytimes.com/library/tech/98/12/biztech/articles/07/patents.html.*

"Ringing in advertising no mobiles", Jun. 2, 1999, Hong Kong Standard.*

"SPOTCAST communications names advertising luminaries to its board; Company is pioneer in emerging mobile phone advertising sector", PR Newswire, p9502, Jul. 27, 1999.*

"Endure an ad, make a free call", Wireless Week, Nov. 15, 1999.*

(List continued on next page.)

*Primary Examiner*—Jeffrey D. Carlson

(57) ABSTRACT

Electronic advertising devices and methods of using the same for providing targeted advertisements to one or more individuals based on the individual(s) consumer profile(s). The devices or systems include a sensor or receiver for receiving identifying signals from individuals such as signals emitted by cellular telephones. Using information associated with or retrieved using the identifying signal, targeted advertisements are delivered to the individuals.

72 Claims, 3 Drawing Sheets

U.S. PATENT DOCUMENTS

| | | | | |
|---|---|---|---|---|
| 5,933,811 | A | | 8/1999 | Angles et al. ................. 705/14 |
| 5,937,037 | A | | 8/1999 | Kamel et al. ............ 379/88.19 |
| 5,937,392 | A | | 8/1999 | Alberts ......................... 705/14 |
| 5,947,592 | A | | 9/1999 | Barlow ....................... 362/345 |
| 5,948,061 | A | * | 9/1999 | Merriaman et al. ......... 709/219 |
| 5,959,623 | A | | 9/1999 | van Hoff et al. ............ 345/333 |
| 5,966,696 | A | * | 10/1999 | Giraud ......................... 705/14 |
| 5,969,704 | A | | 10/1999 | Green et al. ................. 345/113 |
| 5,991,735 | A | | 11/1999 | Gerace ......................... 705/10 |
| 5,991,737 | A | | 11/1999 | Chen ............................ 705/26 |
| 5,992,888 | A | | 11/1999 | North et al. .................. 283/56 |
| 5,995,015 | A | | 11/1999 | DeTemple ............. 340/825.49 |
| 5,995,607 | A | | 11/1999 | Beyda et al. ................ 379/202 |
| 5,999,912 | A | | 12/1999 | Wodarz et al. ................ 705/14 |
| 5,999,975 | A | | 12/1999 | Kittaka et al. .............. 709/224 |
| 6,002,393 | A | | 12/1999 | Hite et al. ................... 345/327 |
| 6,006,197 | A | | 12/1999 | d'Eon et al. .................. 705/10 |
| 6,009,409 | A | | 12/1999 | Adler et al. ................... 705/14 |
| 6,009,410 | A | | 12/1999 | LeMole et al. ................ 705/14 |
| 6,014,080 | A | | 1/2000 | Layson, Jr. .............. 340/573.1 |
| 6,014,502 | A | | 1/2000 | Moraes .................. 395/200.49 |
| 6,014,638 | A | | 1/2000 | Burge et al. .................. 705/27 |
| 6,026,368 | A | | 2/2000 | Brown et al. ................. 705/14 |
| 6,026,369 | A | | 2/2000 | Capek .......................... 705/14 |
| 6,026,370 | A | | 2/2000 | Jermyn ........................ 705/14 |
| 6,031,467 | A | | 2/2000 | Hymel et al. .......... 340/825.44 |
| 6,034,652 | A | | 3/2000 | Freiberger et al. ............. 345/2 |
| 6,055,510 | A | | 4/2000 | Henrick et al. ............... 705/14 |
| 6,073,727 | A | | 6/2000 | DiFranza et al. ............ 187/396 |
| 6,078,896 | A | | 6/2000 | Kaehler et al. ............... 705/14 |
| 6,084,583 | A | | 7/2000 | Gerszberg et al. .......... 345/867 |
| 6,084,628 | A | | 7/2000 | Sawyer ........................ 725/34 |
| 6,089,284 | A | * | 7/2000 | Kaehler et al. ............... 141/94 |
| 6,119,098 | A | | 9/2000 | Guyot et al. .................. 705/14 |
| 6,122,658 | A | | 9/2000 | Chaddha ..................... 709/203 |
| 6,128,651 | A | | 10/2000 | Cezar .......................... 709/217 |
| 6,141,010 | A | | 10/2000 | Hoyle ......................... 345/356 |
| 6,157,814 | A | | 12/2000 | Hymel et al. .............. 455/31.1 |
| 6,157,841 | A | | 12/2000 | Bolduc et al. .............. 455/456 |
| 6,219,696 | B1 | | 4/2001 | Wynblatt et al. ........... 709/218 |
| 6,250,428 | B1 | | 6/2001 | Amo et al. .................. 187/391 |
| 6,252,522 | B1 | | 6/2001 | Hampton et al. ........... 340/905 |
| 6,298,218 | B1 | * | 10/2001 | Lowe et al. .................. 455/66 |
| 6,332,127 | B1 | * | 12/2001 | Bandera et al. ............... 705/14 |

FOREIGN PATENT DOCUMENTS

| | | |
|---|---|---|
| WO | WO 00/49541 | 8/2000 |
| WO | WO 00/65576 | 11/2000 |
| WO | WO-00/77978 A2 * | 12/2000 |
| WO | WO 01/35265 | 5/2001 |
| WO | WO 01/37595 | 5/2001 |

OTHER PUBLICATIONS

Webpage Article entitled "Banner Ads—Big Time!" by Jeffrey R. Harrow, from RCFoc—The Rapidly Changing Face of Computing, Jan. 24, 2000 (*http://www.compaq.com/rcfoc/20000124.html*) (pps. 1–3).

Webpage Article entitled "IBM and World Theatre, Inc. poised to revolutionize outdoor advertising" (*http://www.ibm.com/news/1999/12/23.phtml*).

Webpage Article entitled "Is that an Ad in Your Pocket!: Advertising on Mobile Devices could be e–marketing's next big thing" by Michael Pastore, Feb. 7, 2000 (*http://adres.internet.com/feature/article/0,1401,8961_299991,00.html*).

Webpage Article entitled "Advertising & Promotion: Advertising Technology: High Wireles", by Kyle Lewis, SAM Magazine, Jan. 2001 (*http://www.sammag.com/jan01/ap/$p_{13}$Wireless.htm*).

Webpage Article entitled "Unit of United Technologies (UTC) to Buy Equity Stake in Next Generation Network", Dec. 23, 1999 (http://www.ngn.com/company_info/UTC.htm).

"The hands in the cookie jar", *U.S. News & World Report*, Feb. 7, 2000, p. 63.

"Turning Pixels Into Panache: Nasdaq's Sign on Times Sq. Fulfills a High–Tech Dream", *The New York Times*, Feb. 17, 2000, p. B1 and B10.

Web page of CNN Food Central—"Faster Fast Food: Drive–Through without Stopping" at www.cnn.com/2000/FOOD/news/01/28/fast.food.reut.

* cited by examiner

ELECTRONIC ADVERTISING DEVICE AND METHOD OF USING THE SAME

BACKGROUND OF THE INVENTION

1. Field of the Invention

The invention relates to improved advertising devices such as advertising displays and/or loudspeakers and methods of using the same. More specifically, the invention relates to advertising devices which communicate advertisements to targeted individuals based on information relating to the individual's consumer profile.

2. Description of the Related Art

Several publications are referenced in this application. The references describe the state of the art to which this invention pertains and are hereby incorporated by reference.

For many years, merchants have advertised their goods and services to the general public in order to increase business and/or distinguish themselves from their competitors. For close to fifty years, television advertising, for example, has provided a means to reach millions of potential viewing consumers. Over the years, advertisers have attempted to focus their advertisements towards individuals who are most likely to be positively affected by the ads. On early Saturday mornings, for example, many television ads are often geared towards children who tend to watch the morning programs. On the other hand, during the late evening news, the ads are typically directed to a more mature audience. The technique of targeting is based on crude demographic assumptions. For example, an advertisement for sit-down lawnmowers may be aired during a Sunday night professional football game based on the assumption that a high percentage of the viewers will be men. Of course, even assuming this assumption is true, not every man watching the program will desire and/or need a sit-down lawnmower. Thus, the placement of ads based on demographic targeting is not particularly accurate.

One type of advertising that has at least partially addressed the crudeness of demographic targeting is direct marketing. In direct marketing, an advertisement or promotional information is sent directly to an individual typically based on a consumer profile of the individual. Such consumer profiles are well known and are created by credit card companies and the like. See, U.S. Pat. No. 6,026,370 to Jermyn. The drawbacks of direct advertising practices are that the types of advertisements employed (e.g., printed materials) and the costs associated with these ads decrease the efficiency and/or flexibility of the technique.

Another well-known advertising device is the conventional billboard, such as "static" advertising devices, which continue to maintain their popularity. Such devices are used along roadways, in airport terminals, at bus depots, on the sides of buses, in restaurant restrooms, etc. See, U.S. Pat. No. 5,947,592 to Barlow; U.S. Pat. No. 4,754,582 to Cameron (Telephone booth with advertising displays); U.S. D317,790 to He; U.S. Pat. No. 5,150,116 to West; U.S. Pat. No. 5,543,856 to Rosser, et al.; U.S. Pat. No. 5,703,564 to Begum, et al.

These traditional advertising boards are "static" in that the advertising image is permanently or semi-permanently affixed to the boards. One drawback of such billboards is that in order to change the message, it is necessary to physically change the message by either replacing the sign or repainting, repapering or otherwise physically changing the message.

More recently, "dynamic" billboards such as electronic billboards have been employed and are known in the art. Such devices allow the information to be displayed and changed electronically or otherwise. See, "Turning Pixels into Panache: Nasdaq's Sign on Times Sq. Fulfills a High-Tech Dream", New York Times, page B1 and B10, Feb. 17, 2000. These devices allow for a variety of messages to be communicated by the device without the physical changes required by the earlier "static" billboards. This has also enabled the use of video and animation technologies to display the information. See also, U.S. Pat. No. 5,606,154 to Doigan et al. (Timed Advertising In Elevators and Other Shuttles); U.S. Pat. No. 5,969,704 to Green et al. (Configurable LED matrix display).

Other prior art devices include the following:

U.S. Pat. No. 5,214,793 to Conway et al. discloses an electronic and vehicle traffic control communication system which is intended to replace existing billboards. Information transfer is effected using short bursts of microwave pulses from independent transmitters placed in selected locations along roadways. The transmitted signals are coded prior to transmission and decoded after being received by receivers in the vehicles. After decoding the pulses, a receiver will retrieve complete messages from a data base included as part of the in-vehicle receiver system. At the selection of the driver, the messages can be displayed or replayed audible. The Conway patent also describes other systems for communicating traffic and commercial information to drivers.

U.S. Pat. No. 5,848,129 to Baker discloses a billboard system which produces, in addition to the visual message provided by an associated billboard, a related audio message that is transmitted to passing vehicles and which enables ready changing of the message to be transmitted, at all times of the day, by calling the change in over a telephone line from a remote location such as a business office or advertising agency.

U.S. Pat. No. 5,966,696 to Giraud relates to electronic billboards which include a sensor for determining when an individual is within the advertising range and a tracker to track consumer exposure to a number of different advertisements.

Of course, the purpose of an advertisement is to encourage a future transaction between the an individual and the company sponsoring the ad. Such companies and their advertisers typically pay to have advertising messages displayed on such displays. The effectiveness of an advertisement is typically a result of a number of factors. The content and style of the ad is typically geared to "catch" an individual's attention and increase the likelihood the individual will react favorably to the ad (i.e., purchase the product and/or service being advertised). The effectiveness of the ad is also determined by which individuals and how many individuals are exposed to the ad. Currently, advertisers are faced with the difficult task of determining where to place ads to reach a certain targeted audience. An advertisement for a sale on golf clubs by an advertising store may be optimally located near a golf course to reach a high concentration of potentially interested golfers. Since the ad would be located outside a city, the cost of placing the ad may be less expensive then if it was placed at a busy intersection of a city. However, such an ad would only reach a small number of consumers (i.e., those that pass by that particular golf course). A greater number of individuals may be exposed to the ad if placed on a busy avenue such as Fifth Avenue in midtown New York City where thousands of consumers may pass a properly placed sidewalk ad on any given day. However, only a fraction of those passing individuals may be potential golf consumers. Therefore, the costs of placing the ad in such a location may not be justified since, although a large number of individuals will be exposed to the ad, the ad would be properly targeted to only a fraction of those who see it.

Thus, a significant drawback of such displays is that they treat all consumers the same. This is a severe limitation given virtually all consumer oriented industries are trending from market or segment-focused marketing and advertising toward consumer or individual-focused marketing and advertising. Thus, the effectiveness of previous advertising billboards and other advertising devices suffers due to their inability to display or otherwise convey messages which are targeted to one or more individuals within the range of the advertisement.

It would be desirable to provide an advertising system and method which selects and displays advertisements which are targeted to individual(s). More specifically, it would be desirable to provide an effective way of delivering targeted advertisements to passive consumers who are not interacting with the advertising system such as by using a personal computer via the internet and who are most likely to positively respond to the ad, e.g., purchase and/or use the products or services being offered or advertised.

OBJECTS OF THE INVENTION

It is an object of the invention to overcome the above-identified deficiencies.

It is another object of the invention to provide an advertising device which delivers targeted advertisements to individuals within the advertising range of the device and a method of using the same.

It is a further object of the invention to provide an advertising device which delivers targeted advertisements to individuals based on the individuals consumer profile and a method of using the same.

It is a still further object of the invention to provide an advertising device which delivers optimized targeted advertisements to two or more individuals based on the combination of consumer profiles using fuzzy logic.

The foregoing and other objects and advantages of the invention will be set forth in or apparent from the following description.

SUMMARY OF THE INVENTION

It is an object of the invention to provide improved systems and methods for delivering targeted information such as targeted advertisements to one or more individuals. More specifically, the invention relates to improved advertising devices such as billboards and audio announcement systems and the like and methods of using the same.

The ability to provide ads that are specifically geared to the target consumer's individual interests is a more efficient and effective advertising technique. Moreover, an ad geared to the target consumer's interests is more likely to be attractive and thus noticed by the consumer.

The system and method displays advertisements specifically targeted to one or more individuals within the device's advertising range based on information relating to those individuals. This is achieved by providing the device with the means for receiving and identifying the individuals prior to displaying or during the display of the selected targeted advertisements. According to one preferred embodiment, signals from the one or more proximate individuals are received by the system and a consumer profile or the like is identified based on the signal. Such identifying signals may include the signature signals emitted by cellular telephones or the signature signals emitted by devices such as automobile transponders which allow motorists to pass through highway tolls without stopping to pay the toll collector, e.g., automatic toll charging system (See, U.S. Pat. No. 6,019,285 to Isobe et al.). Once the advertising device receives the identifying signal(s) and identifies the one or more individuals, the device retrieves information from a consumer profile database which includes information regarding the individual(s) and this information is used to select and display targeted advertising to the individuals.

The above and other objects, aspects and advantages of the invention will become readily apparent to one of ordinary skill in the art in view of the following detailed description, which reference to the accompanying drawings.

DETAILED DESCRIPTION OF THE INVENTION

Figure 1:
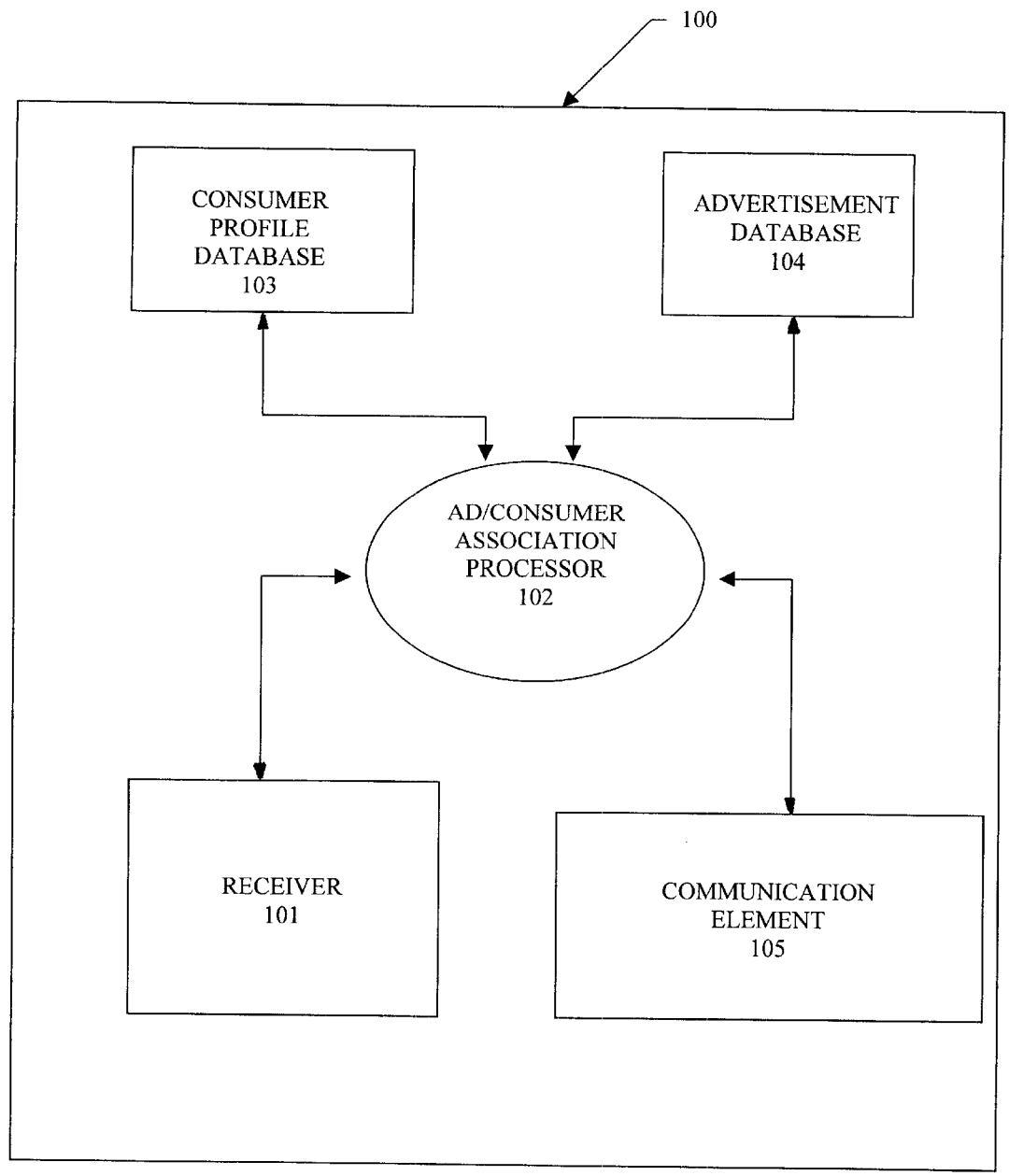
FIG. 1 illustrates a block diagram of a system according to one embodiment of the present invention.

The term "ad" as used throughout this description is intended to indicate both commercial advertisements and non-commercial messages of any sort including commercial advertisements and promotional messages, public service announcements, etc. The messages may be visual, audio or audio-visual, using a variety of media including video, audio, text and/or graphics. For example, technologies currently exist which deliver information and advertising to computer users via the World Wide Web. The formats and contents of the messages communicated by the systems of the present invention can include ads similar to the types of advertising displayed on Web pages via the Internet (U.S. Pat. No. 6,009,410 to LeMole et al.; U.S. Pat. No. 6,009,409 to Adler et al.; U.S. Pat. No. 5,937,392 to Alberts; U.S. Pat. No. 5,959,623 to van Hoff et al.; U.S. Pat. No. 5,913,040 to Rakavy et al.; U.S. Pat. No. 5,933,811 to Angles, et al.; U.S. Pat. No. 5,948,061 to Merriman et al.), except the ads of the invention are displayed on an advertising device instead of a personal computer.

The term "display" or "communication element" is intended to include any means of conveying the advertisement, announcement or message including visual, audio or combinations of both. Thus, the term "display" includes visual displays, loudspeakers and the like.

The term "advertising device" is intended to include devices which display/communicate ads (e.g., visual, audio, visual/audio, holographic 3D, animation, static image(s), etc.) to the public.

The term "advertising range" is intended to refer to the area in which the advertising device effectively communicates the advertisements. A display on the back of the front seat of a taxicab, which is one embodiment of the invention, would have a more limited advertising range than a large billboard on the side of a building, which is another embodiment of the invention.

The invention provides a system for more efficiently advertising products and services to target individuals using relevant information relating to the individuals to select the targeted advertisements. The term "targeted advertisement" is intended to include not only to selecting the content of the advertisement (e.g., cigars vs. stockings), but also preferably the style of the advertisement (e.g., ads geared for a young professional, college student or retired senior citizens). This allows the advertising device to more effectively advertise the product(s) and/or service(s) being marketed.

The invention provides targeted advertisements by detecting identifying signals emitted from individuals and delivering targeted advertisements to the individuals using the identifying signals to retrieve consumer profile information relating to the individuals. Advertisers, for example, find it desirable to target advertisements to relevant potential consumers. An advertisement relating to a sale on golf clubs, for example, would be more effective if targeted at individuals who have an interest in golf products. As another example, an advertiser for stockings would prefer to target women rather than men. A Chicago restaurant would prefer the target residents of Chicago or frequent business travelers to the Chicago area as opposed to an individual who does not visit or live in Chicago. Previous advertising devices fail to precisely target advertisements to individuals likely to be impacted by the advertisements. Preferably, the device is linked to information relating to airline or other travel information and targets advertisements to individuals based on their travel arrangements.

In addition to providing targeted advertisements to one or more individuals, the invention preferably achieves this without input or actions taken by the individuals. That is, the invention provides the targeted advertisements based on identification signals that are automatically emitted by devices such as cellular telephones and highway toll transponders without any action by the individuals except carrying the device. Preferably, the advertising device is not "accessed" by the targeted individuals. Instead, the target individuals passively receive the ads as the ads are delivered (e.g., displayed) by the advertising device. This is unlike the advertisements displayed on a personal computer screen where the computer user is logged into the Internet and interacts with the Internet thereby causing a targeted banner ad to be displayed on the user's display.

Thus, according to one preferred embodiment, the device is not interactive in that the target consumer is passive except for carrying a signal emitting device. Preferably, the advertising device and the emitting device are not the same (e.g., the device is not merely a personal computer having a modem and a display). That is, the display of the ad device is not attached to the signal emitting device carried by the target consumer. Thus, the display of the invention excludes prior art on-line advertising where an individual logs onto the Web using a device having a display and the Web transmits targeted advertising to the user's display, rather than to an advertising device. See, for example, U.S. Pat. No. 5,933,811 to Angles, et al.

Cell phones, for example, emit radio frequency (RF) signals so that the phone can communicate with a fixed site transceiver. U.S. Pat. No. 6,020,787 to Kim et al.; U.S. Pat. No. 6,021,122 to Tiedemann, Jr.; U.S. Pat. No. 6,026,305 to Salinger et al.; U.S. Pat. No. 6,026,304 to Hilsenrath et al. Likewise, automobile transponders also typically emit identifying signals. See, U.S. Pat. No. 6,025,799 to Ho et al.

According to one embodiment, the identifying signals are electromagnetic signals such as those emitted by cellular telephones. Most of the data handled by the cellular telephone network relates to the operation of the cellular telephone network, such as information to provide cellular registrations, calling processing, and hand-off procedures. For example, when a cellular phone is turned on, every six to eight seconds it outposts is electronic serial number (ESN). For each carrier, when a cellular phone is activated, the carrier assigns a Mobile Identification Number (MIN). When the SEND key on the unit is depressed, the phone sends out both the ESN and the MIN. Thereafter, the carrier's switch verifies that the MIN is associated with the ESN for billing purposes. See U.S. Pat. No. 6,014,555 to Tendler. One embodiment of the invention relates to a device which identifies the individuals based on the ESN emitted by the cellular telephone. According to another embodiment, the system includes a device which identifies the caller registration number when a call is made.

The device may also retrieve identifying signals from other mobile identifying transponders such as the EZ Pass™ devices or other transponders which permit motorists to skip stops on highway toll roads. See also, "Faster fast food: Drive-through without stopping", www.cnn.com/2000/FOOD/news/01/28/fast.food.reut/index.html.

Other signals could include those emitted by hand-held computers such as the Palm Pilot™ or portable computers and beepers. Suitable signals may also include those emitted by any personal tracking device. See for example, U.S. Pat. No. 6,014,080 to Layson, Jr.

Thus, unlike previous "targeted advertisements", such as those found on the World Wide Web, it is not necessary that the targeted individual logs onto the Web or otherwise interacts with the advertising delivery system (e.g., by calling someone on the cellular telephone). As long as the individual is carrying a device that emits an identifying signal, the advertising systems and methods of the invention can provide targeted advertisements.

According to one aspect of the invention, an advertisement system for delivering advertisements to one or more individuals within the advertising range of the system is provided. The system includes a sensor or receiver for receiving identifying signals emitted by one or more electronic devices carried by or associated with the targeted individual (e.g., a cellular phone, handheld computer, beeper, highway toll electronic transponder, etc.). The receiver enables the system to retrieve the identifying signals, which, in turn, are used to access and/or retrieve consumer profile information regarding the individuals. With the consumer profile information, an advertisement may be selected based on the consumer profile information so that the advertisement is geared towards that individual.

According to one embodiment, two or more ads from one or more ad sources (e.g., companies, ad agencies, etc.) are displayed simultaneously and/or sequentially.

Thus, one embodiment of the invention relates to an advertising device comprising a receiver or sensor for receiving identifying signals and a communication element for delivering one or more advertisements to one or more individuals, wherein the communication element delivers targeted advertisements based on the identifying signals.

Another preferred embodiment relates to a communication device, such as an advertising billboard, which includes (a) communication element including a visual display and/or audio communicator, (b) a receptor which receives identifying signals and/or identifies one or more individuals within the advertising range of the device, (c) a consumer profile database, or element for accessing the database, the database including consumer profile information relating to said one or more individuals, (d) a message/ad database including message information such as advertisements or a link to a message/advertisement database, and (e) a message selection means, wherein the message selection means selects message information (e.g., an ad) to be communicated by said communication device using said consumer profile information.

The optimized advertising is achieved using a combination of features. These features include the ability of the device to display a plurality of advertisements. Preferably, the plurality of advertisements are stored in a database which may be included in the device. Alternatively, the advertising device may include a link to one or more external databases which may include the consumer profiles and/or advertisements. The link may be provided by cable, modem, wireless data modem, cellular technology or any other means of retrieving information from an external database. According to one embodiment, the device is linked via the Internet to a source for the consumer profiles and a source for the advertisements. Preferably, the device can link to a variety of databases comprising a variety of advertisements. For example, the device may be provided with an Internet link which allows to device to retrieve, access and/or download consumer profiles, advertisements and other information from the World Wide Web.

According to one embodiment, the device selects and displays advertisements based on identified targeted individuals who are proximate to the advertising range of the system. Thus, the advertisements are targeted based on an electronic profile of the individuals which may include personal characteristics of the individuals. These characteristics includes gender, age, profession/occupation, education, income, religion, ethnicity, country of origin, marital status, interests, hobbies, affiliations, travel history, etc. The information may be derived, for example, from purchases the individuals have made in the past or requests for information made by the individuals regarding certain products and services. Such a profile may be created from a variety of sources including the individuals on-line activities on the World Wide Web. These activities may include navigation choices, content preferences, shopping preferences, etc. For example, on-line shopping environments today allow computer users to purchase products and/or services from a variety of merchants, vendors, manufacturers and service providers, each of which may maintain an on-line site for users to visit. Suitable consumer databases profiles could include databases such as those created by Abacus Direct Corp, which maintains a database of the names, addresses, demographics, and retail, catalog, and online purchase histories of 90 percent of the U.S. households. *U.S. News & World Report*, Feb. 7, 2000,. "Personal Tech: The Hands in your Cookie Jar", or Double Click, Inc. which maintains a similar database. U.S. Pat. No. 5,937,037 to Kamel et al. describes a consumer profile bank used in a telecommunications system for delivering promotional messages. Such consumer profile databases are known in the art as well of methods of creating the same. See also, U.S. Pat. No. 5,933,811 to Angles, et al.

FIG. 1 illustrates an advertising device 100 according to one embodiment of the invention which includes receiver 101, ad/consumer association processor 102, consumer profile database 103, advertisement database 104 and communication element 105. Receiver 101 receives or "listens" for identifying signals emitted by one or more individuals. Using the received identifying signal, receiver 101 communicates, preferably via ad/consumer association processor 102, with consumer profile database 103 to retrieve consumer profile information using the identifying signal. According, to one embodiment processor 102 may be omitted and the remaining components directly linked. The consumer profile information, in turn, is used to select a target advertisement from advertisement database 104, which targeted advertisement is transmitted to communication element 105 which delivers the targeted advertisement to targeted individuals within the advertising range of device 100.

Receiver 101 can include any suitable electronic device capable of receiving identifying signals emitted from devices such as cellular telephones and the like. Such devices are well known in the art of cellular communications, for example. Preferably, receiver 101 can sense or receive a variety of different types of identifying signals such as signals emitted by cellphones, beepers, handheld computers and also signals emitted by devices made by different manufacturers. For example, receiver 101 preferably can receive signals emitted by a first cellular device with service provided by a first long distance carrier (e.g., Sprint) and signals emitted by a second cellular device with service provided by a second long distance carrier (e.g., AT&T).

According to one embodiment, receiver 101 can simultaneously receive multiple signals. Preferably, the device provides targeted advertisements based on the signal which has the most relevant or "attractive" consumer profile. That is, if five signals are identified, the device preferably delivers a targeted advertisement geared to the individual having a consumer profile which indicates the highest value advertising, such as a high net worth individual with a strong consumer record (e.g., profile indicates the individual purchased a product after being exposed to a targeted advertisement in the past).

Alternatively, the device employs fuzzy logic or other programing to create a "composite profile" based on a cross-section of five consumer profiles retrieved using the five signals and delivers an optimized targeted advertisement to the five individuals. For example, a targeted advertisement may be delivered to the five individual based on a common trait shared by two, three, four or each of the individuals. For example, if there are three identified individuals and their profiles indicate that they are all avid skiers, the targeted advertisement may be for a sale on ski equipment at a certain store.

Preferably, the system performs a ranking function to determine the optimal ad to display to two or more persons. The optimal ad may be determined by the advertising fees generated by displaying the advertisements and/or the strength of the match between the advertisement profile and the consumer profile(s).

The system also preferably includes an identification processor (e.g., ad/consumer associate processor 202) which selects or facilitates the selection of the targeted advertisements. Preferably, the processor retrieves a consumer profile based on the identifying signal and retrieves or selects one or more advertisements from an advertisement database to be displayed to the targeted individual based on the consumer profile. For example, referring to FIG. 1, the system includes ad/consumer association processor 102 which correlates or matches the retrieved consumer profile to a targeted advertisement. Such processors are well known in the art and/or within the purview of one of ordinary skill in the art. Suitable processors would include those employed for selected targeted ads in on-line advertising methods.

Consumer profile database 103 includes a plurality of consumer profiles. Data regarding the individual's preferences may be collected from a variety of sources. See, for example, U.S. Pat. No. 6,014,638 to Burge et al. This raw data may be processed to create a preference profile of the individual. Thus, consumer profiles are well known in the art (see above referenced patents) and can include a wide variety of information relating to the individual consumers. Suitable consumer profile databases include those employed in prior direct marketing efforts and/or on-line targeted advertising. According to one embodiment, the consumer profile includes an "abbreviated profile code" which indicates which consumer subgroup the individual belongs. This would allow for facilitated matching with the targeted advertisement. For example, an identifying signal may retrieve an abbreviated profile code which is then quickly matched with a targeted advertisement which is then delivered to the individuals. Preferably, the abbreviated profile code is also the "ad tag" for the targeted advertisement. Thus, for example, an identifying signal may retrieve an abbreviated profile code "AX100202" and this code is used to retrieve ads tagged or categorized under a code "AX100202" or closely related to the code.

Alternatively, the profile code may be embedded in the identifying signal thereby removing the need to access a consumer profile database. Thus, once the identifying signal is identified, a targeted ad is directly retrieved.

The system may also apply a scheduling criteria to select ads, in addition to selection based on the consumer profile, from eligible ad candidates such as: random selection; selection based on time of day and/or day of week; location of the device; selection based upon the number of times that an ad has been displayed in a specific time frame and/or a "least recently viewed" algorithm. See, U.S. Pat. No. 5,999,912 to Wodarz, et al.; U.S. Pat. No. 5,933,811 to Angles, et al.

Advertisement database 103 includes a plurality of advertisements with can be delivered by the device. According to one embodiment, the advertising information is categorized by type of product and/or service being advertised. Preferably, a plurality of advertisements are stored in a medium such that selected advertisements can be retrieved and displayed to targeted identified individuals within the advertising range.

According to one embodiment, the ads have more than one set of targeting parameters (e.g., women over 40 years of age and income greater than $100,000 or all individuals residing in a certain geographic area such as Manhattan). According to one embodiment, the advertisements can have "ad tags" to indicate the characteristics of the ad and facilitate matching with consumer profiles. For example, the system may employ an association processor for comparing preset targeting criteria of each advertisement with a consumer profile. The "tagged" advertisement may be stored in one database, while the consumer profiles are stored in another database ("consumer profile database"). Preferably, each advertisement has an identification code and has associated targeting parameters. For example, a particular ad may having the following targeting parameters: single men, ages 25–35, income greater than $50,000 and Washington, D.C. residence. The invention allows such an ad to be targeted at individuals who meet the targeting parameters. Thus, the invention provides a means for associating ads with all or a subset of individuals falling within the ad's targeting parameters using the consumer profile.

Preferably, the advertisements are stored in a database and are presorted or categorized by targeting parameters to facilitate retrieving target ads, once the consumer profile is retrieved.

Preferably, the system displays the most targeted (profitable) advertisements before less targeted ads, more preferably doing so in an economically maximizing way by sequencing from the most targeted (and, therefore, most profitable) to the least targeted advertisements.

According to one preferred embodiment, the display system is connected to a advertising repository server. See, U.S. Pat. No. 6,009,410 to LeMole et al. For example, the advertisements may be selected from an electronic storehouse of plural different subscribing advertisers and their associated ads, images, video and/or audio ads, etc.

Preferably, the system also automatically generates "non-targeted" ads when no identifying signal is received and/or when no consumer profile is available.

Communication element 105 delivers the advertisement or message. It can include an electronic billboard which can display a variety of different images and/or a speaker to play audio messages. Suitable examples include highway billboards, signage along streets or in public mass transportation terminals, store front displays, etc. For example, the communication can comprise a liquid crystal display (LCD), LED, plasma panel display or the like.

Also included within the invention is a display screen onto which is projected an image from a projector. See, U.S. Pat. No. 5,257,017 to Jones, et al. which discloses an electronic billboard signing which electro-micro circuitry is utilized to display advertising information onto a large front billboard screen by a large moveable lens. U.S. Pat. No. 5,920,634 to Chiquette relates to an advertising display that replays a prerecorded audio message when activated by an attendant listener. U.S. Pat. No. 5,133,081 to Mayo relates to a remotely controllable message broadcast system. U.S. Pat. No. 5,150,116 to West relates to signage and advertising displays and more specifically to a startable and stoppable advertising display device for use in association and in coordination with a traffic light.

Preferably, the system includes a projection means for projecting visual and/or audio advertisements. Suitable projection means include LCD, LED, TVs, loudspeakers, etc. Preferably, the device includes a housing and/or protective shield to protect the projection means from the weather, vandalism or the types of damage. Preferably, the protective shield comprises a strong translucent material such as translucent polycarbonate. Preferably, the housing comprises a strong, waterproof material such as stainless steel, plastic or the like. Preferably, the device also comprises a means for securing the device or the communication element (if remote from the device) to the side of a building, along a highway, etc. The communication element may be remote from but linked to the other elements of the system.

Thus, the display can be visual or audio. Visual displays include those found at bus stops, off of highways, above urinals in public restrooms, etc. Audio advertisements may include those on elevators, waiting lounges, on buses. Suitable displays include electronic displays such as LED devices. See, U.S. Pat. No. 5,969,704 to Green, et al.

For a visual advertisement, the size of the display should be suitable for the available advertising range provided by the environment where the device is located. If the average consumer is viewing the advertisement from a distance of two to three feet (e.g., an LCD display on the back of the front seat of a taxi or in an elevator), the display preferably has a longest dimension ranging from 1 to 3 feet and a smallest dimension ranging from 2 inches to 3 feet. If the display is a roadside billboard where the viewing distance may be ten feet, 100 feet or more, the display can have a largest dimension between 2 feet and 100 feet or greater.

According to one embodiment, the advertising device comprises a display and/or loudspeaker which is suitable for attachment to the back of the front seat of a taxi cab or in a large bus. Preferably, the dimensions of the display is between three inches to three feet in width, more preferably, six inches to two feet in width, and preferably between three inches to three feet in height, more preferably, six inches to two feet in height. Such a device would preferably include a protective housing and means for securing the device.

Preferably, the device also includes a volume control and/or display control to allow the consumer to control the delivery of the advertisements and mute the system if desired. More preferably, such a system would automatically turn back on after a certain period of time and/or have a remote control to adjust the volume or display which can be used by the taxi driver. Other embodiments of the invention include similar devices for commercial airplanes, buses, limousines, elevators, etc.

Figure 2:
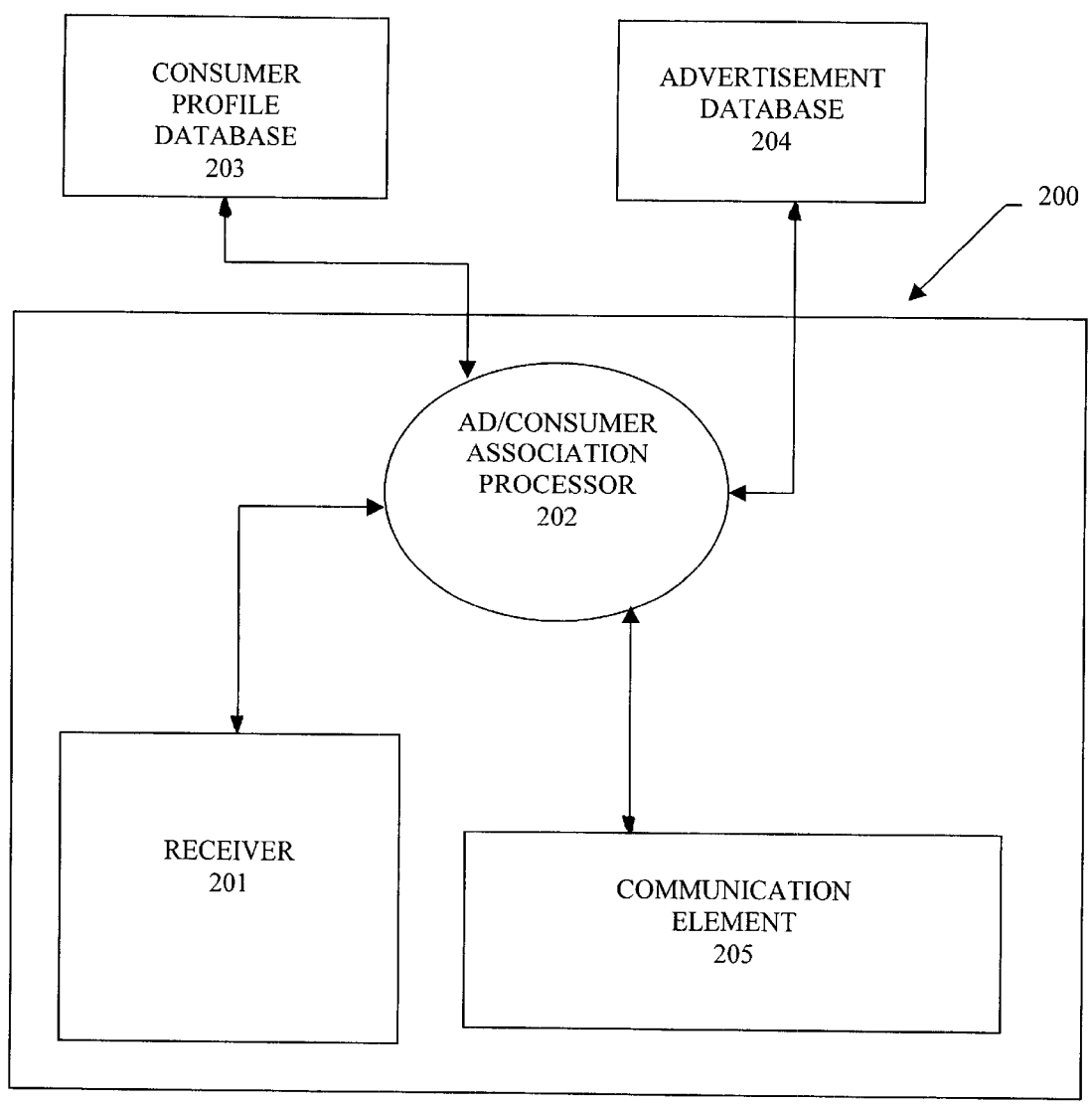
FIG. 2 illustrates a block diagram of a system according to another embodiment of the present invention.

Another embodiment of the invention includes a device which is linked to the consumer profile database and/or advertisement database. That is, the device does not include either database. Referring to FIG. 2, device 200 comprises receiver 201, ad/consumer association processor 202 and communication element 205. The device may be also linked to consumer profile database 203 and advertisement database 204, which may be remote from device 200.

Figure 3:
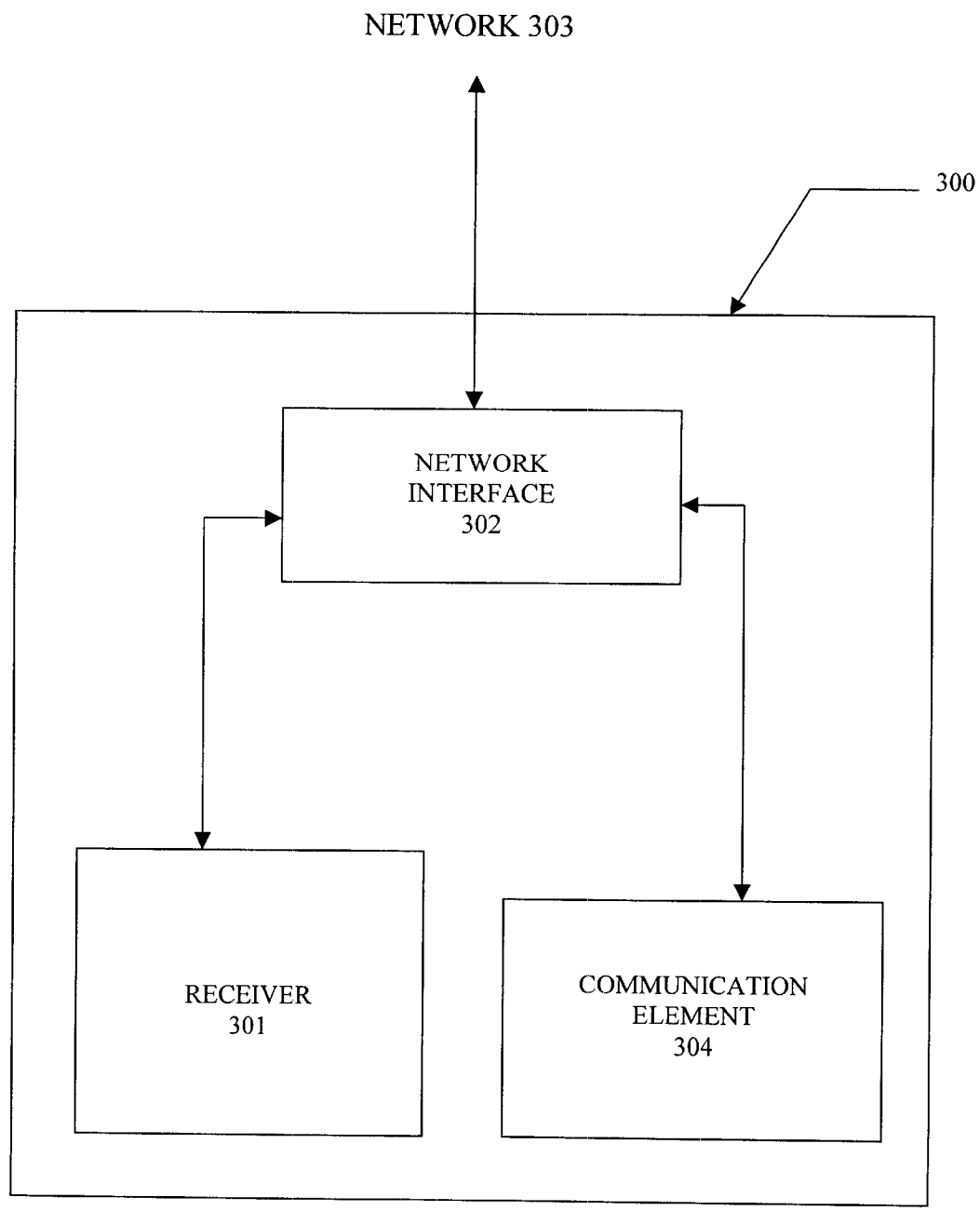
FIG. 3 illustrates a block diagram of a system according to another embodiment of the present invention.

Referring to FIG. 3, device 300 comprises receiver 301, network interface 302 and communication element 304. Device 300 may be linked to a network 303 via network interface 302.

According to one embodiment, the device is interactive in that after it displays an advertisement (targeted or nontargeted), the device also provides a means for allowing the individuals within the device's advertising range to provide feedback and/or request additional information. The interactivity allows consumers to interact with the device at any time or during completion of an advertisement. For example, the system may include an external button or the like which can be pressed by an individual to obtain additional information regarding the product or service being advertised, input feedback and/or pause or reverse the ad sequence to review the current or a previously displayed advertisement. Since the ads are preferably targeted ads, the ability of the device to allow for such feedback could be advantageous since the individuals exposed to the ads are intended to have an interest in the content of the ad and are likely to desire additional information. According to one embodiment, a targeted individual can interact with the advertising device using their cellular phone, for example, where the user would dial a certain series of numbers or with keystrokes to communicate with the device.

According to another embodiment, the method or system is connected to a network such as the Internet. Company subscribers pay to have their ads downloaded and/or delivered by the device and/or pay an additional premium when a target ad is delivered to a targeted consumer or group of consumers. See, U.S. Pat. No. 5,946,646. According to another preferred embodiment, the number of signals detected and/or advertisements displayed are recorded for billing purposes. Preferably, the device also includes a "filter" which may filter out targeted ads which may be objectionable to the targeted consumer.

Preferably, the invention includes a central storage system for storing a plurality of advertisements and/or comprises a means for certifying and/or recording that an advertisement has been displayed. See, U.S. Pat. No. 5,774,170 to Hite et al.; U.S. Pat. No. 6,002,393 to Hite et al.

Another feature includes the device's ability to identify individuals within or proximate the advertising range of the device. The advertising range of a device would depend on a variety of factors such as the size and type of advertising devices, it's location and the presence of other advertising devices (e.g., "crowding"). The advertising range may include a portion of a highway or road for a billboard or a portion of a sidewalk for a smaller advertising device. Another example may include a smaller range such as a small electronic display on the back of at the front seat of a taxi cab. Another example may include in audio advertising device in an elevator where the advertising range would be the space within the elevator.

The inventive device also includes a means for retrieving identifying signals from one or more individuals within the advertising range and just outside the advertising range (e.g., the receiver). The signals collected from just outside the advertising range would be useful where individuals pass by the advertising device quickly and, therefore, lead time is beneficial to enable the device to identify the individual and then retrieve and display one or more selected advertisements as the individuals pass within the advertising range.

According to another preferred embodiment, the system comprises the receiver or series of receivers to track the motion of a targeted individuals so that the display of the advertisement can be appropriately timed. The detectors may include a series of advertising devices which each include a sensor for sensing the emitted signal and the devices communicate with each other. For example, the motion of an individual could be determined with three or more detectors or receivers by triangulation. Alternatively, a line of detectors can be used to track the motion of signal to time ad placement with the targeted individual walking by on a sidewalk. Another embodiment would include or be linked to a global positioning system (GPS) or the like for tracking an individual. See, U.S. Pat. No. 6,018,704 to Kohli; U.S. Pat. No. 6,020,847 to Upton; U.S. Pat. No. 6,014,080 to Layson; U.S. Pat. No. 6,025,799 to Ho; U.S. Pat. No. 6,026,304 to Hilsenrath; U.S. Pat. No. 6,026,305 to Salinger et al.

Preferably, the device also includes a power source such as a battery, solar panels or other power source. Alternatively, the device may be linked to an external power source.

Preferably, the advertising system also includes a means or mechanisms for allowing individuals to remove their profiles from the profile database such that the device will not display targeted advertising directed at them in the future. This would be beneficial to protect any privacy concerns of such individuals. For examples, preferably, an individual may telephone the system operator and request that their profile be removed. Alternatively, the system may allow the user to direct a selected signal code, such as can be punched into a cell phone, at the device to remove their profile.

Another aspect of the invention relates to an advertising device which displays targeted advertising to an individual after the individual submits an identifying signal to the device and exchange for free entertainment services such as music, radio and/or television or other audio or visual entertainment. According to one embodiment, the individual may input an identification number such as a credit card number or the like and the individual is provided with the use of a service or products for a period of time. For example, an individual may input an identification into an airport television and be provided with free television, with targeted advertisements. Another example may include an electronic game which the identified user is allowed to use while targeted advertisements are being displayed. Such devices would not require a receiver.

According to another embodiment, the "ad" displayed to a target consumer is recorded. Then, when the target consumer undertakes post-impression transactional activity such as ordering products and/or services related to the displayed ad or makes further inquiries regarding the same, the transactional activity along with the consumer's identification is recorded. Based on these records, the effectiveness of the ads can be measured. See, U.S. Pat. No. 6,006,197 to d'Eon, et al. Preferably, additional fees are charged to the ad source based on the effectiveness of the ads.

Preferably, the advertisement identification underlying each advertisement is pre-correlated to the advertisement, with each advertisement having its own unique advertisement identification. One embodiment of the invention uses an advertising command which identifies a particular location on the advertising storage medium, such as the particular track and sector where the advertisement is stored.

Preferably, the system allows sponsors of the advertisements to place conditions on when the ad is displayed. For example, a sponsor for ads relating to snowblowers may desire that the ad be directed to men at least 35 years old and having an income greater than $80,000 throughout the winter months, but be delivered to all men of any income level during snow storms.

According to another preferred embodiment, the device further comprises a sensor means determining the presence of an individual within the advertising range of the device. The sensor may include a camera, an ultrasound detector, a photodetector, or a heat detector. According to a still further preferred embodiment of the invention, the sensor system is capable of determining whether an individual is viewing the advertisement being display. See, U.S. Pat. No. 5,966,696 to Giraud.

Another aspect of the invention relates to methods of providing targeted advertisements to one or more individuals. Preferably, this is achieved using the above-identified devices.

One embodiment of the invention relates to a method for delivering targeted advertising on an advertising device comprising:

(a) detecting an identification signal from at least one individual;

(b) retrieving a consumer profile based on said identification signal;

(c) selecting one or more targeted advertisements based on said consumer profile; and (d) delivering said one or more targeted advertisements via a communication element.

Another embodiment of the invention relates to a method of delivering targeted advertising to one or more individuals comprising:

retrieving an identification signal emitted by a communication device on an individual; and delivering a targeted advertisement using the identification signal.

Preferably, the method further comprises associating the display of the targeted advertisement to subsequent transactional activity by said individuals and/or tracking the duration and frequency of the displayed advertisement.

Preferably, the method further comprises tracking a percentage of the fee which will be paid to an administrator of said identification signal (e.g., a cellular telephone provider).

One of ordinary skill in the art would readily recognize, in view of the teachings set forth above, that the present invention may employ similar targeting methods and systems employed in targeted online advertising. For example, the advertisement databases and/or consumer profiles, as well as methodologies and systems for matching information from both, which were used in prior art advertising systems may be employed in the present invention. Similarly, electronic billboards and signage known in the art, some of which have been described above, may also be modified according to the invention to provide targeted advertising methods and systems.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

What is claimed is:

1. An electronic advertising device for delivering one or more targeted advertisements to one or more individuals comprising:

(a) a communication element for delivering said one or more targeted advertisements to said one or more individuals; and (b) a receiver for receiving identifying signals emitted from one or more emitters carried by or associated with said one or more individuals;

wherein said electronic advertising device displays and/or broadcasts said one or more targeted advertisements to said one or more individuals and said one or more targeted advertisements are selected using said identifying signals and further provided that said communication element is not structurally connected to said emitters and wherein said receiver is configured to receive identifying signals emitted from one or more emitters selected from the group consisting of cellular telephone, beeper and combinations thereof.

2. The electronic advertising device of claim 1, wherein said identifying signals include a personal identification number.

3. The electronic advertising device of claim 1, wherein said identifying signals are electromagnetic signals.

4. The electronic advertising device of claim 1, wherein said identifying signals are identified by said receiver when emitted from a location within the advertising range of the electronic advertising device.

5. The electronic advertising device of claim 1, further comprising an advertisement database including a plurality of advertisements or a link to said advertisement database.

6. The electronic advertising device of claim 1, further comprising a consumer profile database including a plurality of consumer profiles or a link to said consumer profile database.

7. The electronic advertising device of claim 1, further comprising an association processor.

8. The electronic advertising device of claim 7, wherein said association processor accesses a consumer profile using said identifying signals and selects one or more targeted advertisements based on the consumer profile.

9. The electronic advertising device of claim 7, wherein said association processor compares preset targeting criteria of said one or more advertisements with said consumer profile of said one or more individuals and thereby selects targeted advertisements to deliver to said one or more individuals via said communication element.

10. The electronic advertising device of claim 1, wherein said electronic advertising device comprises a housing for said communication element and said receiver.

11. The electronic advertising device of claim 1, wherein said communication element comprises a visual display, a loudspeaker or combinations thereof.

12. The electronic advertising device of claim 5, wherein said plurality of advertisements are categorized by advertising content including advertised services, advertised products or combinations thereof.

13. The electronic advertising device of claim 6, wherein said consumer profile database includes at least one type of consumer information selected from the group consisting of (a) recent purchases of consumer, (b) residence of consumer, (c) business and/or profession of consumer, (d) demographics of consumer, (e) recent product and/or service inquiries of consumer, (f) ethnicity, (g) age, (h) income, (i) hobbies or combinations thereof.

14. The electronic advertising device of claim 1, wherein said electronic advertising device is an electronic billboard and said communication element comprises a visual display.

15. The electronic advertising device of claim 1, wherein said communication element comprises a visual display and/or a loudspeaker.

16. The electronic advertising device of claim 1, wherein said communication element comprises a visual display having a longest dimension ranging from 1 to 3 feet and a smallest dimension ranging from 2 inches to 3 feet.

17. The electronic advertising device of claim 1, wherein said communication element comprises a visual display having a longest dimension ranging from 2 feet to 100 feet.

18. The electronic advertising device of claim 1, further comprising a protective housing and a means for securing said electronic advertising device.

19. The electronic advertising device of claim 1, wherein said device is capable of displaying non-targeted advertisements when identifying signals are not detected.

20. The electronic advertising device of claim 1, wherein said device is linked to the internet.

21. The electronic advertising device of claim 1, wherein said identifying signals are automatically emitted by said one or more emitters.

22. An electronic advertising system for distributing advertising information comprising:
(a) a display connected to at least one database, said at least one database including advertising information; and
(b) a signal detector for detecting electromagnetic signals from emitters associated with one or more individuals, wherein said-electronic advertising system displays and/or broadcasts targeted advertising information to said one or more individuals based on said electromagnetic signals and further provided that said display is not structurally connected to said emitters and wherein said signal detector is configured to detect electromagnetic signals from emitters selected from the group consisting of cellular telephone, beeper and combinations thereof.

23. The electronic advertising system of claim 22, wherein said display comprises a visual display having a longest dimension ranging from 2 feet to 100 feet.

24. The electronic advertising system of claim 22, wherein said display comprises a visual display having a longest dimension ranging from 1 feet to 3 feet.

25. The electronic advertising system of claim 22, further comprising a means for securing said system.

26. The electronic advertising system of claim 22, wherein said electromagnetic signals are automatically emitted by said emitters.

27. A method for selectively delivering targeted advertising on an advertising device comprising:
(a) detecting an identification signal from at least one individual;
(b) retrieving a consumer profile based on said identification signal;
(c) selecting one or more targeted advertisements based on said consumer profile; and
(d) delivering said one or more targeted advertisements via a communication element of said advertising device,
wherein said detecting step comprises detecting an identification signal emitted by an emitter selected from the group consisting of cellular telephone, beeper, and combinations thereof and said communication element is not structurally connected to said emitter.

28. The method of claim 27, wherein said communication element comprises a visual display.

29. The method of claim 27, wherein said identification signal is emitted by a mobile cellular telephone.

30. The method of claim 27, further comprising repeating steps (a)–(d).

31. The method of claim 27, wherein said detecting includes detecting two or more identification signals and retrieving two or more consumer profiles associated with said two or more identification signals and providing said one or more advertisements based on said two or more consumer profiles.

32. The method of claim 27, further comprising accessing a consumer profile using said identification signal and selecting one or more targeted advertisements based on said consumer profile.

33. The method of claim 32, further comprising comparing preset targeting criteria of said one or more advertisements with said consumer profile, selecting targeted advertisements, and delivering said selected targeted advertisements to said at least one individual.

34. The method of claim 27, further comprising recording post-impression transactional activity of said at least one individual.

35. The method of claim 27, further comprising recording said identification signal detected by said advertising device.

36. The method of claim 27, further comprising recording said one or more targeted advertisements delivered by said device.

37. The method of claim 27, further comprising allowing said at least one individual to obtain additional information from said device.

38. The method of claim 16, further comprising displaying non-targeted advertisements.

39. The method of claim 27, wherein said identification signal is automatically emitted by said emitter.

40. An electronic advertising billboard for displaying one or more targeted advertisements to one or more individuals comprising:
(a) an advertising display; and
(b) a receiver adapted to receive signals emitted from one or more emitters carried by or associated with said one or more individuals;

wherein said electronic advertising billboard displays targeted advertisements to said one or more individuals based on said signals and further provided that said advertising display is not structurally connected to said emitters and wherein said receiver is adapted to receive signals emitted from one or more emitters selected from the group consisting of cellular telephone, beeper and combinations thereof.

41. The electronic advertising billboard of claim 40, wherein said signals include a personal identification.

42. The electronic advertising billboard of claim 40, wherein said signals comprise a profile code or an ad tag.

43. The electronic advertising billboard of claim 40, further comprising an advertisement database including a plurality of advertisements or a link to said advertisement database.

44. The electronic advertising billboard of claim 40, further comprising a consumer profile database including a plurality of consumer profiles or a link to said consumer profile database.

45. The electronic advertising billboard of claim 40, further comprising an association processor.

46. The electronic advertising billboard of claim 45, wherein said association processor accesses a consumer profile using said signals and selects one or more targeted advertisements based on said consumer profile.

47. The electronic advertising billboard of claim 45, wherein said association processor compares preset targeting criteria of said one or more advertisements with a consumer profile of said one or more individuals and thereby selects targeted advertisements to deliver to said one or more individuals via said advertising display.

48. The electronic advertising billboard of claim 40, further comprising a housing for said advertising display.

49. The electronic advertising billboard of claim 40, wherein said advertising display comprises a visual display, a loudspeaker or combinations thereof.

50. The electronic advertising billboard of claim 43, wherein said advertisements are categorized by advertising content including advertised services, advertised products or combinations thereof.

51. The electronic advertising billboard of claim 44, wherein said consumer profile database includes at least one type of consumer information selected from the group consisting of (a) recent purchases of consumer, (b) residence of consumer, (c) business and/or profession of consumer, (d) demographics of consumer, (e) recent product and/or service inquiries of consumer, (f) ethnicity, (g) age, (h) income, (i) hobbies or combinations thereof.

52. The electronic advertising billboard of claim 33, wherein said signals are automatically emitted by said one or more emitters.

53. The electronic advertising billboard of claim 40, wherein said targeted advertisements are passively received by said individuals.

54. A method for delivering targeted advertising using an advertising device comprising a display comprising:

(a) detecting a signal emitted from an emitter associated with at least one individual; and (b) displaying one or more targeted advertisements to said at least one individual using said display, wherein said display comprises a visual display, a loudspeaker or combinations thereof, wherein said display is not structurally connected to said emitter and wherein said detecting step comprises detecting a signal emitted from an emitter selected from the group consisting of cellular telephone, beeper and combinations thereof.

55. The method of claim 54, wherein said one or more targeted advertisements are retrieved from an advertisement database.

56. The method of claim 54, further comprising repeating steps (a)–(b).

57. The method of claim 54, wherein said detecting includes detecting two or more signals and retrieving two or more consumer profiles associated with said two or more signals and providing said one or more advertisements based on said two or more consumer profiles.

58. The method of claim 54, further comprising recording post-impression transactional activity of said at least one individual.

59. The method of claim 54, further comprising recording said signal detected by said advertising device.

60. The method of claim 54, further comprising recording said one or more targeted advertisements delivered by said device.

61. The method of claim 54, further comprising allowing said at least one individual to obtain additional information from said device.

62. The method of claim 54, further comprising displaying non-targeted advertisements.

63. The method of claim 54, wherein said signal is automatically emitted by said emitter.

64. A method for displaying targeted advertisements to one or more individuals using an advertising device comprising a display, in which method one or more targeted advertisements are displayed to said one or more individuals within the advertising range of said advertising device based on signals received from emitters associated with said one or more individual, wherein said display is not structurally connected to said emitters and wherein said signals received are received from emitters selected from the group consisting of cellular telephone, beeper and combinations thereof.

65. The method of claim 64, further comprising recording post-impression transactional activity of said at least one or more individuals.

66. The method of claim 64, further comprising recording said signals detected by said advertising device.

67. The method of claim 64, further comprising recording said one or more targeted advertisements delivered by said device.

68. The method of claim 64, further comprising performing a ranking function to optimize the selection of said one or more targeted advertisements.

69. The method of claim 64, further comprising displaying non-targeted advertisements.

70. The method of claim 64, wherein said signals are automatically emitted by said emitters.

71. A method for displaying targeted advertisements to one or more individuals using an advertising device capable of displaying targeted advertisements based on signals associated with said one or more individuals, in which method one or more targeted advertisements are displayed to said one or more individuals within the advertising range of said advertising device based on signals from emitters associated with said one or more individuals, wherein said display is not structurally connected to said emitters and wherein said signals are emitted from emitters selected from the group consisting of cellular telephone, beeper and combinations thereof.

72. The method of claim 71, wherein said signals are automatically emitted by said emitters.

* * * * *

UNITED STATES PATENT AND TRADEMARK OFFICE
CERTIFICATE OF CORRECTION

| | |
|---|---|
| PATENT NO. | : 6,484,148 B1 |
| APPLICATION NO. | : 09/507448 |
| DATED | : November 19, 2002 |
| INVENTOR(S) | : John E. Boyd |

Page 1 of 1

It is certified that error appears in the above-identified patent and that said Letters Patent is hereby corrected as shown below:

On the Title Pg, Item (56), under "Other Publications", line 1, delete "Riodan," and insert -- Riordan, --, therefor.

On the Title Pg, Item (56), under "Other Publications", line 3, delete "07/patents." and insert -- 07patents. --, therefor.

On the Title Pg, Item (56), under "Other Publications", line 5, delete "no" and insert -- on --, therefor.

On page 2, Item (56), under "Other Publications", line 8, delete "Pocket!:" and insert -- Pocket?: --, therefor.

On page 2, Item (56), under "Other Publications", line 13, delete "Wireles"," and insert -- Wireless", --, therefor.

On page 2, Item (56), under "Other Publications", line 15, delete "$p_{13}$" and insert -- p --, therefor.

In column 7, line 50, delete "2000,." and insert -- 2000. --, therefor.

In column 10, line 26, delete "signing" and insert -- sign in --, therefor.

In column 15, line 56, claim 22, delete "said-electronic" and insert -- said electronic --, therefor.

Signed and Sealed this
Fifteenth Day of November, 2011

David J. Kappos
*Director of the United States Patent and Trademark Office*